Aug. 21, 1923.
P. W. JOHNSON
1,465,396
SHOCK ABSORBER FOR AUTOMOBILE SPRINGS
Filed March 23, 1922
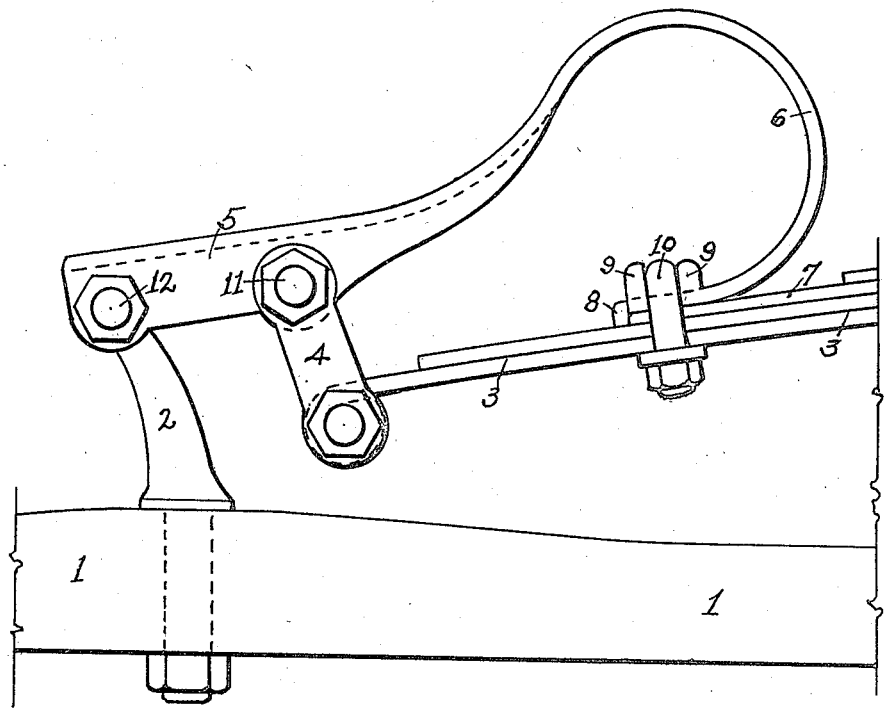
Paul W. Johnson, INVENTOR.

Patented Aug. 21, 1923.

1,465,396

UNITED STATES PATENT OFFICE.

PAUL W. JOHNSON, OF TACOMA, WASHINGTON.

SHOCK ABSORBER FOR AUTOMOBILE SPRINGS.

Application filed March 23, 1922. Serial No. 545,930.

*To all whom it may concern:*

Be it known that I, PAUL W. JOHNSON, a citizen of the United States, resident of the city of Tacoma, in the county of Pierce and State of Washington, have made a new and useful Improvement in Shock Absorbers for Automobile Springs, of which the following is a specification.

My invention relates to shock absorber attachments to the springs of automobiles and other motor driven vehicles. The objects of my invention are to add elasticity to the automobile springs and thus help absorb the shock that results from a vertical jar or jolt, and also to resist the sudden swaying of the car to one side from a like cause.

I attain these objects by the device illustrated in the accompanying drawing, the invention being shown in one view, the several parts being described by referring to the characters by which the same are indicated.

In the drawing the axle of an automobile is represented at 1—1, on which is shown an up-standing post or perch 2 from which one end of an automobile spring 3 is suspended. The opposite end of the spring 3 is suspended in the same manner. The post 2 is shown leaning in the opposite direction from its position when the shock absorber is omitted and the spring 3 is suspended directly from it by means of the spring hangers 4. Without a shock absorber all the elastic strain is put directly on the spring 3 which does not sufficiently absorb the shock from the wheels. Vertical and lateral strains from this shock is often imparted that are injurious to the springs and to the automobile, besides causing uneasiness to the passengers.

Prior to my invention various kinds of shock absorbers have been used to lessen the strains and prevent the uneasiness mentioned. My invention is designed to obtain the objects desired more effectively, and with a more simply constructed attachment to the springs than has been heretofore used.

My invention comprises a one-piece cantilever attachment 5 fixed on the end of the spring 3. The attachment is extended to form semi-circular or horse-shoe shaped spring 6, the extreme end of which is attached at the end of a leaf 7 on the spring 3. The spring 6 terminates with a right angled claw-end 8 to engage the end of leaf 7 to resist the lateral strain imparted to the spring 6. Upturned extensions 9—9 on the sides at the end of spring 6 provide a seat whereby the same is fixed on the spring 3 by means of the U-bolt 10. This U-bolt is set suitably tight and yet loose enough to permit the leaves of the spring 3 to act freely.

The body part of the cantilever attachment 5 has side extensions bent downward at right angles therewith and to which the spring hangers 4 are hung at 11. The end of the cantilever is mounted on the perch 2 at 12, the perch 2 being set to lean oppositely to its usual position as previously mentioned.

It is to be observed that the cantilever attachment is cut or stamped from one piece of spring steel properly formed and tempered to resist the strain imposed. It is designed to be made the width of the spring to which it is to be attached and shaped to fit any make of automobile.

When in use it will be seen that as the axle 1 is suddenly raised by the wheels striking an obstruction, my invention will give added elasticity to the spring 3 by the rocking action of the cantilever attachment 5 and its horse-shoe shaped spring extension 6. The terminal claw 8 acting against the end of the spring leaf 7 will cause the spring 6 to materially absorb any lateral motion caused by turning a curve or by one wheel striking a greater obstruction than the other.

My invention being made of one piece of spring metal has the advantage of being a simple article of manufacture. It is easy to attach to the automobile springs and cannot get out of position by the most extreme use.

Having described my invention, I claim—

1. A shock absorber for automobiles, comprising a unitary cantilever attachment, one end of said attachment being mounted on the outwardly turned perch of the automobile axle, the opposite end of said attachment being extended to form a horse shoe shaped spring, means for attaching the end of said horse shoe shaped spring on the leaves of the automobile spring near its end, the spring hangers of said automobile spring pivotally suspended from the said cantilever attachment, and the end of said horse shoe shaped spring terminated with a downwardly turned claw to engage the end of the spring leaf on which it rests to resist the lateral strain imparted thereto.

2. A shock absorber for automobiles, comprising a unitary cantilever attachment rigidly formed with downwardly turned sides and with a horse shoe shaped spring extension on one end thereof, means for mounting the rigid end on the outwardly turned perch of the automobile axle and means for fixing the said horse shoe shaped spring end on the leaves of the automobile spring, the end of the said automobile spring suspended from the said cantilever attachment between its bearings, and said cantilever attachment with its horse shoe shaped extension made wholly of one piece of spring metal as an article of manufacture.

PAUL W. JOHNSON.